Sept. 11, 1962   E. B. ERICKSON ETAL   3,053,400
AUTOMATIC TIRE CARCASS LOADING APPARATUS
Filed Sept. 8, 1959   5 Sheets-Sheet 2
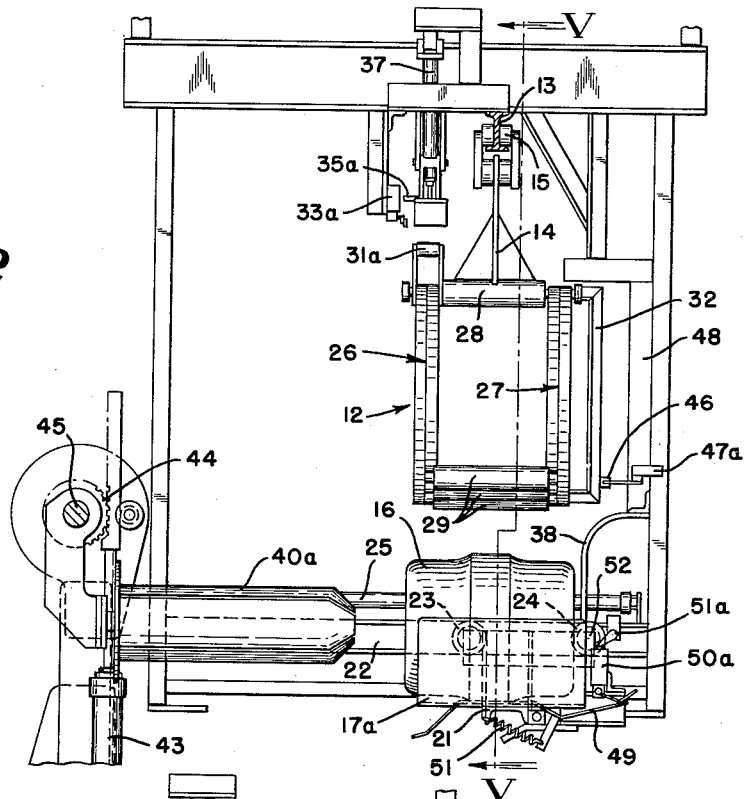
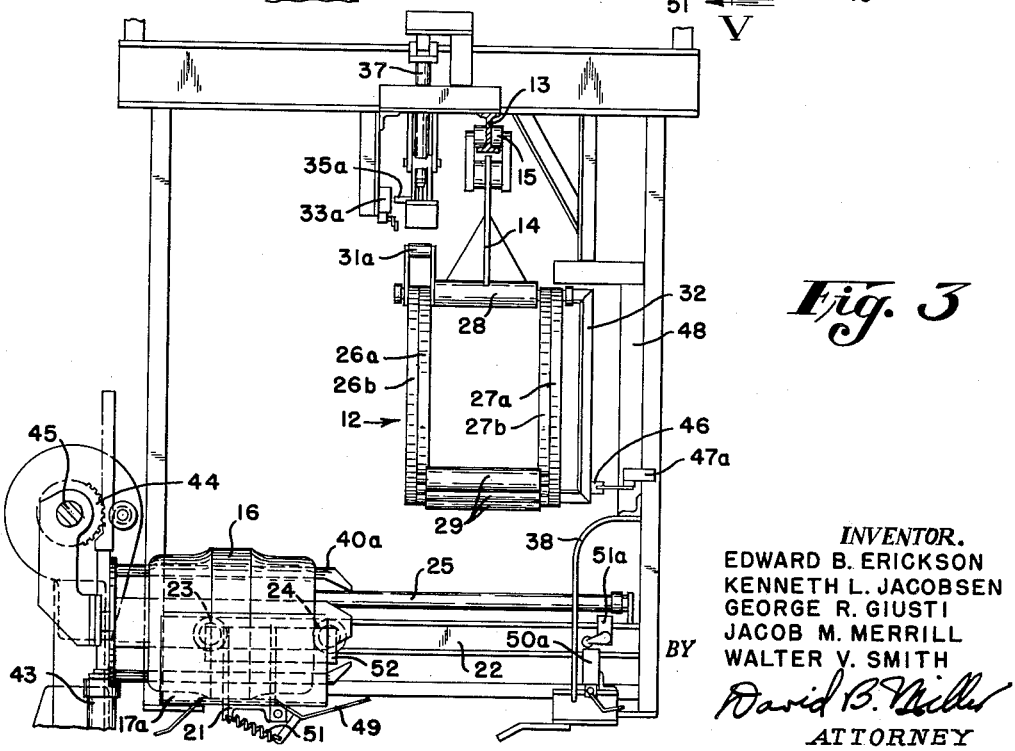
INVENTOR.
EDWARD B. ERICKSON
KENNETH L. JACOBSEN
GEORGE R. GIUSTI
JACOB M. MERRILL
WALTER V. SMITH
BY David B. Miller
ATTORNEY Sept. 11, 1962

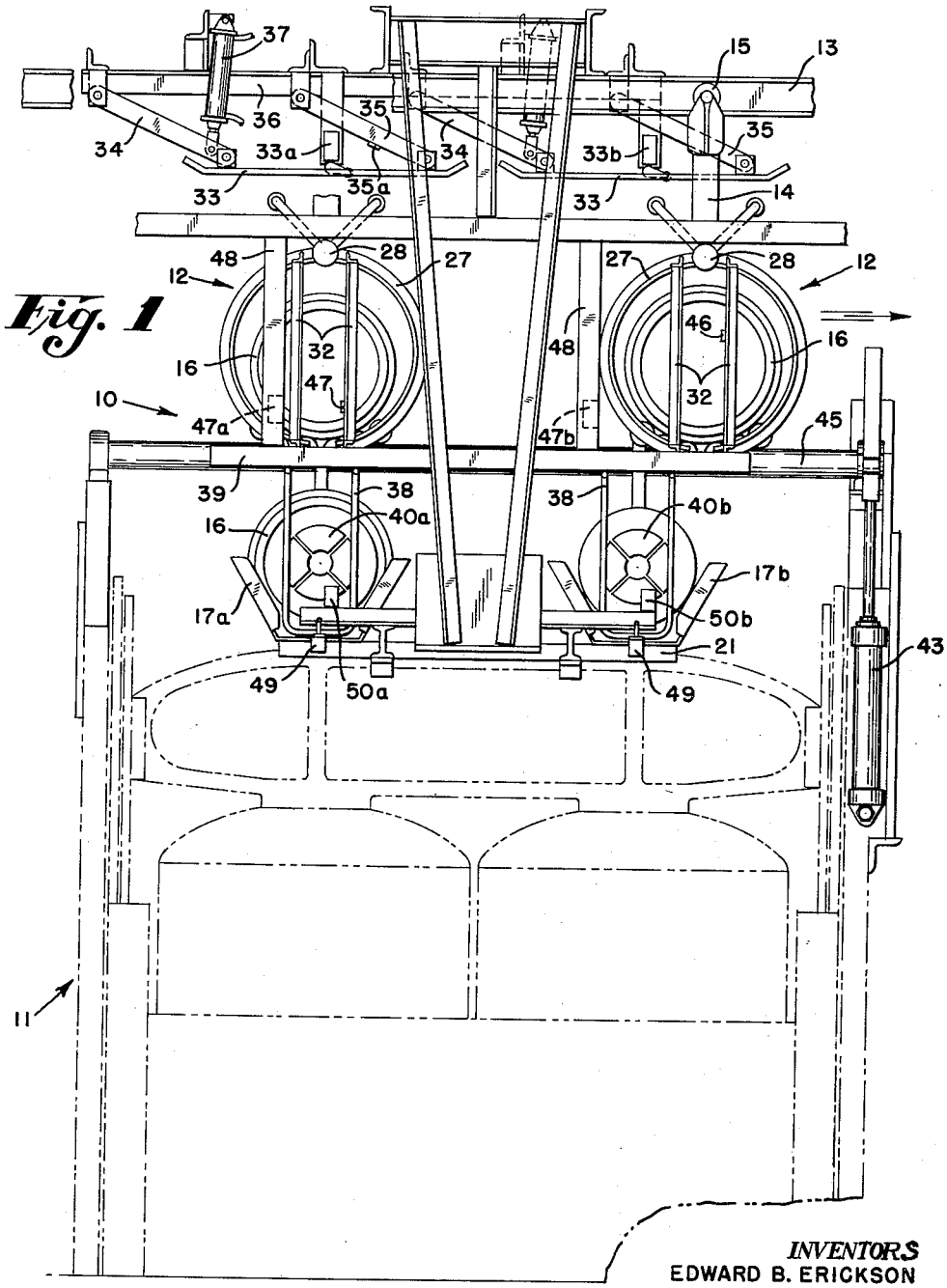

E. B. ERICKSON ETAL 3,053,400

AUTOMATIC TIRE CARCASS LOADING APPARATUS

Filed Sept. 8, 1959

INVENTOR.
EDWARD B. ERICKSON
KENNETH L. JACOBSEN
GEORGE R. GIUSTI
JACOB M. MERRILL
BY WALTER V. SMITH

ATTORNEY

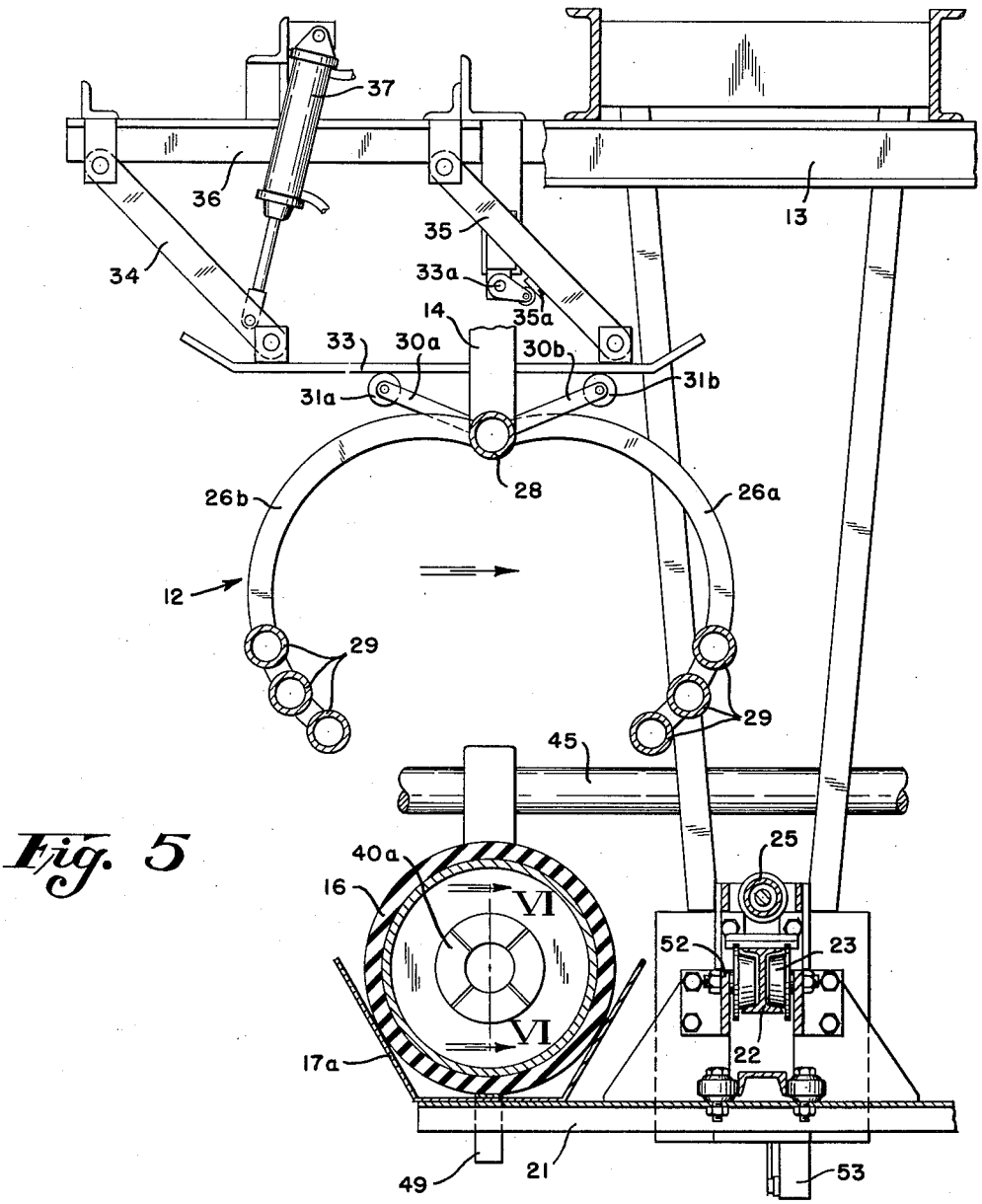

Sept. 11, 1962 E. B. ERICKSON ETAL 3,053,400
AUTOMATIC TIRE CARCASS LOADING APPARATUS
Filed Sept. 8, 1959 5 Sheets-Sheet 5
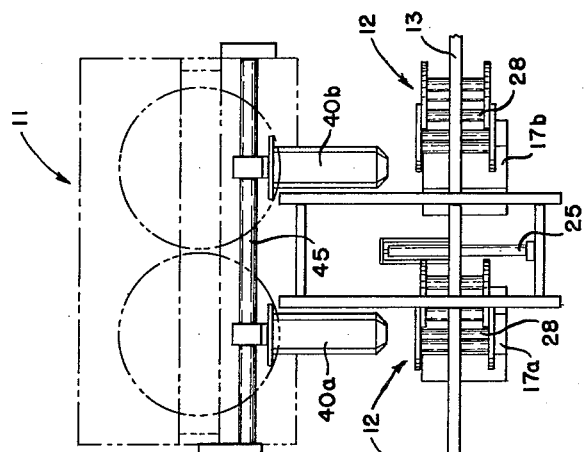
Fig. 7
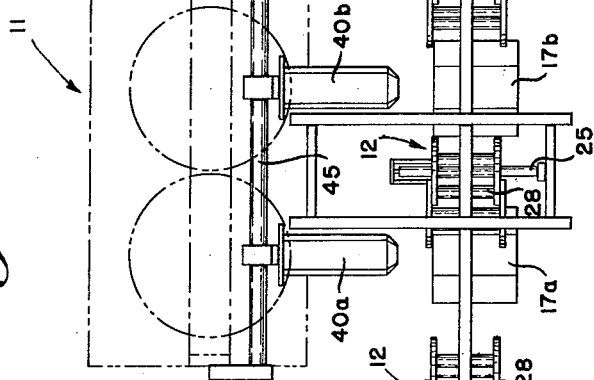
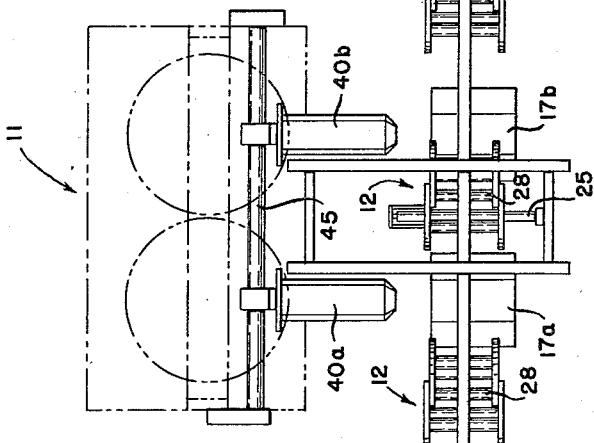
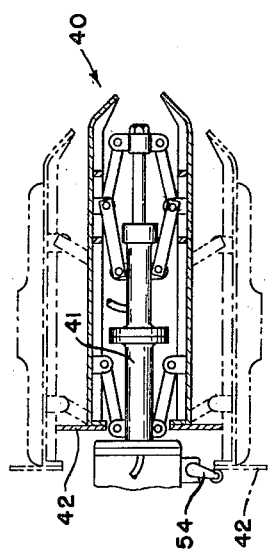
Fig. 6
INVENTOR.
EDWARD B. ERICKSON
KENNETH L. JACOBSEN
GEORGE R. GIUSTI
JACOB M. MERRILL
BY WALTER V. SMITH
ATTORNEY.

3,053,400
AUTOMATIC TIRE CARCASS LOADING
APPARATUS
Edward B. Erickson, Grosse Pointe, Mich., Kenneth L. Jacobsen, Whittier, Calif., and George R. Giusti, Springfield, Jacob M. Merrill, Granby, and Walter V. Smith, South Hadley, Mass., assignors to United States Rubber Company, New York, N.Y., a corporation of New Jersey
Filed Sept. 8, 1959, Ser. No. 838,482
13 Claims. (Cl. 214—1)

This invention relates to an automatic apparatus for loading tire carcasses into tire molding and vulcanizing presses.

The prior art as exemplified by British Patent No. 799,761 issued on August 13, 1958, to McNeil Machine & Engineering Co. and entitled "Tyre-Moulding Presses," provides a tire carcass loading apparatus having an inclined bucket conveyor for each cavity of a tire molding and vulcanizing press. The tire carcasses are sorted by the operator according to size, composition and type and then placed in the buckets of the inclined conveyor loading the appropriate mold cavity. An expandable chuck is mounted above the mold cavity in a generally vertical position to receive the tire carcass from the inclined conveyor. After receiving a tire carcass, the expandable chuck rotates at least 180° whereby the tire carcass falls onto the expansible diaphragm of the mold cavity.

The tire carcass loading apparatus of the prior art has serious disadvantages in that the expandable chuck must rotate through at least 180° from a vertical position thereby greatly increasing the vertical clearance required above the tire molding and vulcanizing press.

The increased vertical clearance requirement presents a serious problem in the adaptation of such a tire carcass loading apparatus to existing tire molding and vulcanizing presses. Furthermore, the operator must separate the tire carcasses according to the tire desired to be molded and vulcanized in each press. Also, although the conventional tire presses of the "Bag-O-Matic" type have two mold cavities and are generally designed to mold and vulcanize two identical tires, there must be an inclined conveyor for each mold cavity of each press.

It is an object of the present invention to provide an automatic tire carcass loading apparatus having an expandable chuck and carcass delivering means that does not appreciably increase the vertical clearance required above the press.

A further object of the present invention is to provide an automatic tire carcass loading apparatus having a single horizontal conveyor that will provide both mold cavities of one or more tire presses with the appropriate tire carcass, thereby dispensing with manual sorting and loading of the tire carcasses onto a plurality of conveyors as required in the prior art.

A still further object of the invention is to provide a wholly automatic apparatus for selectively delivering to each press, carcasses appropriate for the size and type of mold contained in the press.

Other objects and advantages of the present invention will become apparent from the following description taken in conjunction with the accompanying drawings wherein like reference numerals denote like structural members throughout the drawings and wherein:

FIG. 1 is a front elevation view of the carcass loading apparatus showing the initial phase of the sequential operation of the apparatus as employed in conjunction with a conventional tire press, shown in phantom lines, which receives a pair of tire carcasses for each molding and curing cycle.

FIG. 2 is a side elevation view of the carcass loading apparatus of FIG. 1 showing a further step in the operation of the carcass loading apparatus.

FIG. 3 is a side elevation view showing the movement of the tire carcass from the position of FIG. 2 to a position over one of the expandable chucks.

FIG. 5 is a cross-sectional view taken on line V—V of FIG. 2 showing the operation of the cradle carrier relative to a shuttle car in detail.

FIG. 6 is a cross-sectional view taken on line VI—VI of FIG. 5 showing the structure and operation of the expandable chuck in detail, the expanded position being shown in phantom lines and the collapsed position being shown in solid lines.

FIG. 7 is a schematic illustration of a conveyor disposed for loading a series of tire presses.

Figure 4:
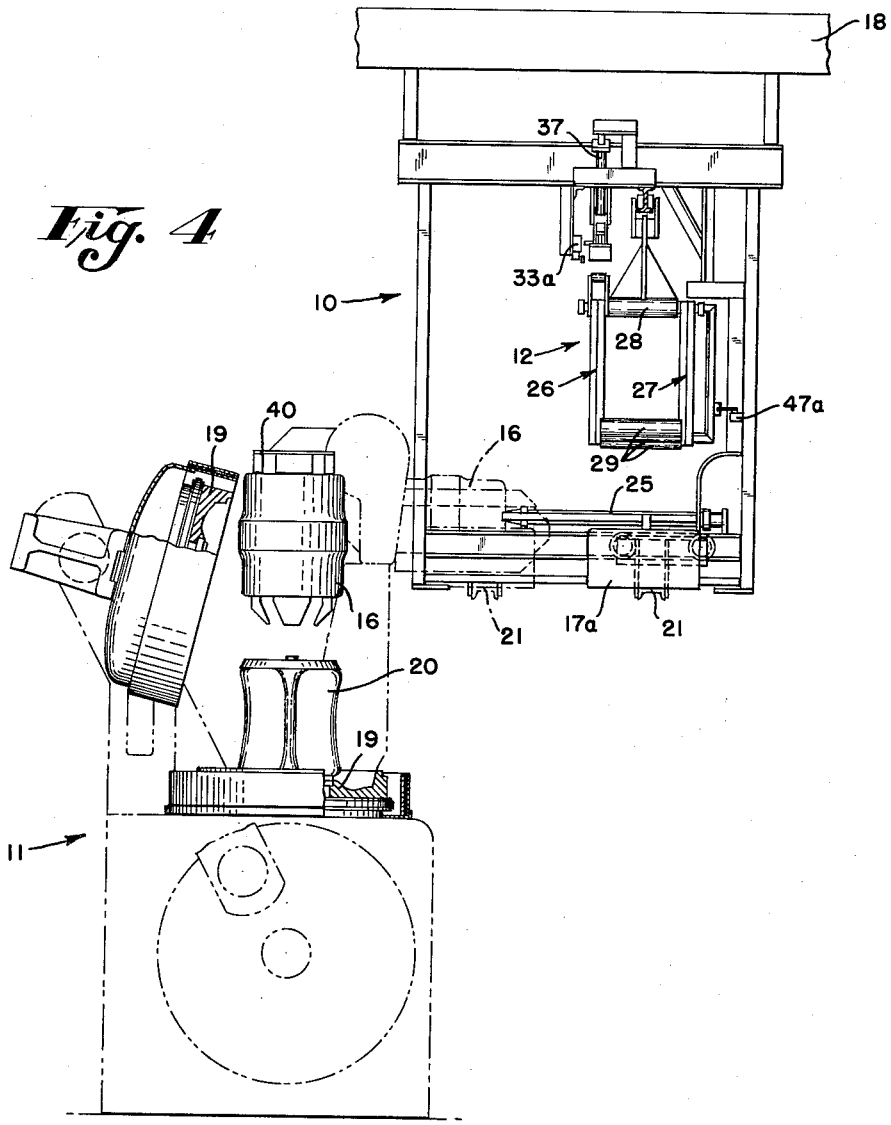
FIG. 4 is a side elevation view of the carcass loading apparatus with parts shown in phantom lines and other parts broken away to show the last two steps in the loading sequence prior to the movement of the tire carcass from the expandable chuck to a position around the flexible and expansible diaphragm of the tire press.

Referring to the drawings, and in particular to FIGS. 1 and 2, the automatic tire carcass loading apparatus 10, as shown in full lines, of the present invention is especially adapted for use in conjunction with a conventional automatic tire press 11, shown in phantom lines in FIGURE 1 and FIGURE 4, of the Bag-O-Matic type that receives a pair of tire carcasses for each automatic molding and curing cycle. FIGURES 2 and 3 illustrate the carcass loading apparatus per se, but it is to be understood that the carcass loading apparatus is positioned relative to a tire press in the manner illustrated in FIGURES 1 and 4.

The carcass loading apparatus has a series of cradle carriers 12 movably mounted on a I-beam 13 of a conventional chain conveyor by means of hangers 14 having rollers 15 at the upper end thereof. The cradle carriers 12 are driven on the I-beam 13 of the conveyor in the direction shown by the arrows in FIGURES 1 and 5 by a chain (not shown) which is connected to the hangers 14 of each cradle carrier 12. In actual practice, a series of automatic tire presses are positioned parallel to a single chain conveyor to be automatically loaded therefrom.

A tire carcass 16 in condition for molding and vulcanizing is placed within each cradle carrier 12. As the automatic tire presses mold and vulcanize tire carcasses of different size, composition and type, the tire carcass loading apparatus is designed to deposit the tire carcasses in the correct size tire press, as will be explained hereafter in detail. The individual cradle carriers 12 are identified by tire size, composition and type and the tire carcasses 16 are placed within the appropriate cradle carrier.

A pair of shuttle cars 17a, 17b are suitably mounted, as from a ceiling 18 as shown in FIG. 4, in front of and above each of the two mold cavities 19 and the flexible and expansible diaphragms 20 of a tire molding and vulcanizing press. The shuttle cars 17a and 17b are secured together by a horizontal channel member 21 which is attached to a central I-beam 22 by means of two pairs of rollers 23, 24. An air cylinder 25 is mounted above the central I-beam 22 for imparting horizontal movement to the shuttle cars 17a, 17b, in a direction lateral to the chain conveyor and at right angles to the press. In this manner, the shuttle cars 17a, 17b reciprocate as a unit between a position directly below the chain conveyor and a position adjacent the press where the tire carcasses 16 are automatically removed from the shuttle cars, as will be described hereafter in detail.

Referring to FIGURES 1 and 5 in particular, there is shown a means for transferring the tire carcasses 16 from their respective cradle carriers 12 to the shuttle cars of the appropriate tire molding and vulcanizing press. Each cradle carrier has a front and rear pair of tongs 26 and 27 respectively which are connected and pivoted at the upper end thereof on a common axis rod 28. The front and rear tongs 26, 27 each have right hooks 26a, 27a and left hooks 26b, 27b as shown in FIGURES 3 and 5. The lower ends of the hooks of the front and rear tongs 26 and 27 are connected by freely rotatable rollers 29, three of such rollers on each hook of the tongs are shown in the drawings by way of example. The front tongs 26 have upper extensions 30a and 30b rigidly secured to the right and left front hooks 26a, 26b respectively, as shown in FIGURES 3 and 5. Each of the upper extensions 30a, 30b of the front tongs 26 have a single freely rotatable roller 31a, 31b at the extremities thereof, as shown in FIGURES 3 and 5. The rear tongs 27 have a single retaining bar 32 rigidly secured across each of the hooks, as shown in FIGURES 1 and 2. The retaining bar 32 prevents the tire carcasses 16 from being displaced too far to the rear of the cradle carriers 12 when the cradle carriers are loaded from the front.

Referring to FIGURES 1, 3 and 5 in particular, there is shown a means for tripping the cradle carriers having a contacting plate 33 connected by a first and second linkage, 34 and 35 respectively, to a stationary horizontal strut 36. The contacting plate is actuated by an air cylinder 37 which is attached at the upper end to the stationary strut 36 by an angle iron and at the lower end to the first linkage 34. When the air cylinder 37 is actuated to lower the contacting plate 33 and open the cradle carrier 12, the tire carcass will freely fall into the shuttle car 17 directly below the cradle carrier. Curved guiding rods 38 are provided at the rear of each shuttle car 17 to insure the correct placement of the tire carcass in the shuttle car. The curved guiding rods 38 are not secured to the shuttle cars but are secured at their upper ends to a stationary horizontal bar 39, as shown in FIGURES 1, 2 and 3. The lower ends of the curved guiding rods 38 are left free from restraint thereby providing a degree of resiliency in the guiding rods.

As shown in FIGURES 1 and 2 in particular, there are a pair of expandable chucks 40a, 40b in horizontal alignment with the pair of shuttle cars 17a, 17b. The expandable chucks 40a, 40b are positioned above and immediately in front of the two mold cavities 19. The forward position of the shuttle cars 17a, 17b is such that the tire carcasses carried by the shuttle cars will be positioned around the collapsed chucks 40a, 40b. The chuck 40 is preferably of the type disclosed in the aforementioned British Patent No. 799,761 to McNeil Machine & Engineering Co., as illustrated in FIGURE 6 of the accompanying drawings wherein the chuck 40 has a central air cylinder 41 which actuates toggle linkages to expand the chuck. The chuck 40 is illustrated as having four expandable sections, by way of example. The forward end of the chuck 40 is tapered to receive the tire carcass and the rear end of the chuck has a stop plate 42 to insure correct positioning of the tire carcass on the chuck.

Provision is made for rotating the chucks 40a, 40b downwardly 90° to a position directly above and in vertical alignment with the flexible and expansible diaphragms 20 of the mold cavities 19, as shown in FIGURE 4, by means of an air cylinder 43 which operates a rack and pinion 44 to rotate the chucks about shaft 45, as shown in FIGURES 1 and 2.

The operation of the automatic tire carcass loading apparatus, beginning with the tires in the press being molded and vulcanized, with the expandable chuck collapsed and in a horizontal position to receive a tire carcass, and with the expandable chucks and shuttle cars empty, is as follows:

The tire carcasses 16 are loaded into the cradle carriers 12 according to the size, composition and type of tire carcass indicated on each individual cradle carrier. The cradle carriers 12 are moved along the I-beam 13 of the chain conveyor with the axis of the tire carcass 16 in a horizontal position and at right angles to the front of the press. The leading retaining bar 32 of each cradle carrier 12 has a rearwardly projecting tripping member 46 which actuates a switch 47a secured to a stationary vertical strut 48, as shown in FIGURES 1 and 2. The tripping members 46 on the cradle carriers 12 are placed at various elevations according to the size, composition and type tire carcass which it is to carry and deliver to the appropriate press. Likewise the switches 47 are placed at various elevations according to the predetermined tire carcass requirements of the mold cavity 19 it is associated with, there being one such switch for each mold cavity. More than one tripping member 46 and switch 47 can be provided for each cradle carrier 12 and mold cavity 19 if additional combinations of tire carcass identification are required. The switch 47a, when actuated will energize a solenoid of a valve (not shown) which activates air cylinder 37 and causes it to lower the contacting plate 33 of the tripping means. The contacting plate 33 is driven downward to depress rollers 31a, 31b of the front hook extensions 30a, 30b of the cradle carrier 12, thereby opening the carrier and allowing the tire carcass to drop into shuttle car 17a positioned directly beneath the tripped cradle carrier 12. The freely rotatable rollers 29 allow the tire carcass to drop without frictional restraint into the shuttle car. The tire carcass 16 is guided into the shuttle car 17a by curved guiding rods 38. The contact plate 33 travels a full stroke to a position where a tripping plate 35a on the second linkage 35 actuates switch 33a as shown in FIGURES 1 and 5 which reverses the action of cylinder 37 to return contact plate plate 33 to the upper position thereby closing the cradle carrier 12.

At this point, the loading apparatus of the tire press is as shown in FIGURE 1, wherein the first shuttle car 17a is loaded and the second shuttle car 17b is empty. The leading cradle carrier of FIGURE 1 contains a tire carcass having a different designation from that required for the instant tire press, as shown by the fact that tripping member 46 is above and has not actuated switch 47b to drop the tire carcass into shuttle car 17b. The following cradle carrier of FIGURE 1 has a tire carcass 16 which is appropriate for the instant tire press as indicated by the equal elevation of tripping member 46 and switch 47a; however, the cradle carrier is not tripped to drop the tire carcass into shuttle car 17a, as the shuttle car is already loaded with a tire carcass which bears down on a springloaded, pressure-responsive switch bar 49, as shown in FIGURES 1 and 2, which deactivates switch 50a. The contacting plate 33 of the tripping means will not lower to open the cradle carrier unless both switch 47a and switch 50a are activated. As the following cradle carrier passes from a position over shuttle car 17a to a position over shuttle car 17b, the tripping member 46 actuates switch 47b, as previously described. As the shuttle car 17b is empty, the spring-loaded switch bar 49 of the shuttle car 17b is pulled down by the spring 51 thereby releasing and activating switch 50b, whereby the contacting plate 33 of the tripping means is lowered and opens the cradle carrier allowing the tire carcass to fall into shuttle car 17b, as previously described. A shuttle car-out switch 51a, as shown in FIGURES 2 and 3, is actuated by plate 52 of the shuttle car central carriage structure as shown in FIGURES 2, 3 and 5. The tripping means is prevented from opening the cradle carriers if the shuttle car-out switch 51a is not actuated.

When both of the shuttle car switches 50a and 50b are deactivated or opened, the opposite sides of double switches 50a and 50b are automatically closed to energize a solenoid of a valve which actuates cylinder 25 to drive both shuttle cars 17a, 17b along the central I-beam 22 towards the tire press. This movement releases or opens shuttle car-out switch 51a and as the shuttle cars go forward to a position around the collapsed chucks 40a, 40b the shuttle car-in switch 53 (FIGURE 5) is opened by contact with the forward end of plate 52 of the advancing shuttle car central carriage structure.

The opening of shuttle car-in switch 53 energizes a solenoid of a valve which activates air cylinder 41 thereby expanding both of the chucks 40a and 40b inside the tire carcasses 16. The expansion of the chucks activates shuttle car-return switch 54, as shown in FIGURE 6, which energizes a solenoid of a valve to actuate air cylinder 25 in the reverse direction, returning the shuttle cars 17a, 17b to the starting position.

When the tire molding and vulcanizing press is opened and the cured tires in the press have been ejected, a solenoid of a valve is energized by the press controls (not shown) causing air cylinder 43 to turn shaft 45 thereby rotating the loaded expanded chucks 40a, 40b into a vertical position in alignment with the flexible and expansible diaphragm 20.

The rotation of the loaded chucks 40a, 40b activates control switches on the press (not shown) which energize a solenoid of a valve reversing the action of air cylinder 41 to collapse the chucks and allow the tire carcasses to fall onto the diaphragm 20. With the release of the tire carcasses from the chucks, the press controls (not shown) energize a solenoid of a valve to reverse air cylinder 43 thereby turning shaft 45 in the opposite direction to rotate the chucks 40a, 40b to a horizontal position in alignment with the shuttle cars 17a, 17b. The tire press then closes and the tire carcasses are molded and vulcanized. This action completes one full cycle of the automatic tire carcass loading apparatus.

It should be understood that it is within the scope of the present invention to adapt the above-described automatic tire carcass loading apparatus for use in conjunction with molding and vulcanizing presses having single rather than double molding cavities and expansible diaphragms.

Having thus described our invention, what we claim and desire to protect by Letters Patent is:

1. Apparatus for automatically loading tire carcasses into a series of molding and vulcanizing presses, each press having at least one mold cavity with a flexible and expansible diaphragm in each mold cavity, comprising a conveyor disposed for movement parallel to and in front of the series of presses, said conveyor having a plurality of carriers for supporting said carcasses, a shuttle car for each mold cavity reciprocal at right angles to the conveyor between a position beneath the conveyor and a position adjacent the mold cavity, an expandable chuck for each mold cavity pivotally mounted over the diaphragm of the mold cavity and adapted to be rotated downwardly from a position in alignment with the shuttle car to a position in alignment with the diaphragm, means responsive to a shuttle car being both empty and in a position beneath the conveyor for depositing a tire carcass from a carrier into said shuttle car, means responsive to the presence of a tire carcass in said shuttle car for moving said shuttle car with a deposited tire carcass to a position adjacent the mold cavity so as to telescope said carcass onto said chuck, means for retracting said shuttle car, and means for actuating said chuck to deposit said tire carcass onto said diaphragm.

2. Apparatus for automatically loading tire carcasses into a series of molding and vulcanizing presses, each press having at least one mold cavity with a flexible and expansible diaphragm in each mold cavity, comprising a conveyor disposed for movement parallel to and in front of the series of presses, said conveyor having a plurality of carriers for supporting carcasses with their axes in a horizontal position at right angles to the front of the presses, a shuttle car for each mold cavity reciprocal at right angles to the conveyor between a position beneath the conveyor and a position adjacent the mold cavity, an expandable chuck for each mold cavity pivotally mounted over the diaphragm of the mold cavity and adapted to be rotated downwardly from a horizontal position in alignment with the shuttle car to a vertical position in alignment with the diaphragm, means responsive to a shuttle car being both empty and in a position beneath the conveyor for depositing a tire carcass from a carried into said shuttle car, means responsive to the presence of a tire carcass in said shuttle car for moving said shuttle car with a deposited tire carcass to a position adjacent the mold cavity so as to telescope said carcass onto said chuck, means for expanding said chuck to engage said carcass, means for retracting said shuttle car, means for rotating said chuck downwardly into alignment with said diaphragm, and means for contracting said chuck to deposit said carcass onto said diaphragm.

3. Apparatus for automatically loading tire carcasses into a series of molding and vulcanizing presses, each press having at least one mold cavity with a flexible and expansible diaphragm in each mold cavity, comprising a conveyor disposed for movement parallel to and in front of the series of presses, said conveyor having a plurality of carriers for supporting carcasses with their axes in a horizontal position at right angles to the front of the presses, a shuttle car for each mold cavity reciprocal at right angles to the conveyor between a position beneath the conveyor and a position adjacent the mold cavity, tripping means mounted above the conveyor and above each shuttle car, an expandable chuck for each mold cavity pivotally mounted over the diaphragm of the mold cavity and adapted to be rotated downwardly from a horizontal position in alignment with the shuttle car to a vertical position in alignment with the diaphragm, means responsive to a shuttle car being both empty and in a position beneath the conveyor for lowering the tripping means above said shuttle car to open a carrier and deposit a tire carcass into said shuttle car, means responsive to the presence of a tire carcass in said shuttle car for moving said shuttle car with a deposited tire carcass to a position adjacent the mold cavity so as to telescope said carcass onto said chuck, means for expanding said chuck to engage said carcass, means for retracting said shuttle car, means responsive to the opening of the press and the ejection of a cured tire for rotating said chuck downwardly into alignment with said diaphragm, means for contracting said chuck to deposit said carcass by gravity onto said diaphragm, and means for rotating said chuck upwardly into alignment with the retracted shuttle car.

4. Apparatus for automatically loading tire carcasses as defined in claim 18 wherein said carriers comprise front and rear tongs pivotally conected at the upper ends thereof by a common axis rod and connected at the lower ends thereof by rollers whereby said tire carcass is wholly contained within said tongs, said front tongs having two extensions secured to the upper ends thereof with a roller at the extremities of each extension, and wherein said tripping means comprise a horizontal contacting plate which when lowered bears on the rollers of the extension of the front tongs, thereby opening the carrier.

5. Apparatus for automatically loading tire carcasses into a series of molding and vulcanizing presses, each press having a pair of mold cavities with a flexible and expansible diaphragm in each mold cavity, comprising a conveyor disposed for movement parallel to and in front of the series of presses, said conveyor having a plurality of carriers for supporting carcasses with their axes in a horizontal position at right angles to the front of the presses, a pair of shuttle cars for each press reciprocal at right angles to the conveyor between a position beneath the conveyors and a position adjacent the press, a pair of expandable chucks for each press pivotally mounted over said diaphragms and adapted to be rotated downwardly from a position in alignment with said shuttle cars to a position in alignment with said diaphragms, means responsive to a pair of shuttle cars being in a position beneath the conveyor and by at least one of said pair of shuttle cars being empty for depositing tire carcasses from said carriers into said shuttle cars, means responsive to the presence of a pair of tire carcasses in said pair of shuttle cars for moving said pair of shuttle cars with said pair of tire carcasses deposited therein to a position adjacent the press so as to telescope said pair of carcasses onto said pair of chucks, means for retracting said pair of shuttle cars, and means for actuating said pair of chucks to deposit said pair of tire carcasses onto said diaphragms.

6. Apparatus for automatically loading tire carcasses into a series of molding and vulcanizing presses, each press having a pair of mold cavities with a flexible and expansible diaphragm in each mold cavity, comprising a conveyor disposed for movement parallel to and in front of the series of presses, said conveyor having a plurality of carriers for supporting carcasses with their axes in a horizontal position at right angles to the front of the presses, a pair of shuttle cars for each press reciprocal at right angles to the conveyor between a position beneath the conveyor and a position adjacent the press, a pair of expandable chucks for each press pivotally mounted over said diaphragms and adapted to be rotated downwardly from a horizontal position in alignment with said pair of shuttle cars to a vertical position in alignment with said diaphragms, means responsive to a pair of shuttle cars being in a position beneath the conveyor and by at least one of said pair of shuttle cars being empty for depositing tire carcasses from said carriers into said shuttle cars, means responsive to the presence of a pair of tire carcasses in said pair of shuttle cars for moving said pair of shuttle cars with said pair of tire carcasses deposited therein to telescope said carcasses onto said pair of chucks, means for expanding said pair of chucks to engage said pair of tire carcasses, means for retracting said pair of shuttle cars, means for swinging said pair of chucks downwardly into alignment with said diaphragms, and means for contracting said pair of chucks to deposit said pair of tire carcasses onto said diaphragms.

7. Apparatus for automatically loading tire carcasses into a series of molding and vulcanizing presses adapted to produce tires of different size, composition and type, each press having a pair of mold cavities with a flexible and expansible diaphragm in each mold cavity, comprising a conveyor disposed for movement parallel to and in front of the series of presses, said conveyor having a plurality of carriers for supporting carcasses with their axes in a horizontal position at right angles to the front of the presses, a pair of shuttle cars for each press reciprocal at right angles to the conveyor between a position beneath the conveyor and a position adjacent the press, a pair of expandable chucks for each press pivotally mounted over said diaphragms and adapted to be rotated downwardly from a position in alignment with said pair of shuttle cars to a position in alignment with said diaphragms, means responsive to a pair of shuttle cars being in a position beneath the conveyor and by at least one of said pair of shuttle cars being empty for selectively depositing tire carcasses of the appropriate size, composition, and type for the press from said carriers into said shuttle cars, means responsive to the presence of a pair of tire carcasses in said pair of shuttle cars for moving said pair of shuttle cars with said pair of tire carcasses deposited therein to telescope said carcasses onto said pair of chucks, means for retracting said pair of shuttle cars, and means for actuating said pair of chucks to deposit said pair of tire carcasses onto said diaphragms.

8. Apparatus for automatically loading tire carcasses into a series of molding and vulcanizing presses adapted to produce tires of different size, composition and type, each press having a pair of mold cavities with a flexible and expansible diaphragm in each mold cavity, comprising a conveyor disposed for movement parallel to and in front of the series of presses, said conveyor having a plurality of carriers for supporting carcasses with their axes in a horizontal position at right angles to the front of the presses, a pair of shuttle cars for each press reciprocal at right angles to the conveyor between a position beneath the conveyor and a position adjacent the press, a pair of expandable chucks for each press pivotally mounted over said diaphragms and adapted to be rotated downwardly from a horizontal position in alignment with said pair of shuttle cars to a vertical position in alignment with said diaphragms, means responsive to a pair of shuttle cars being in a position beneath the conveyor and by at least one of said pair of shuttle cars being empty for selectively depositing tire carcasses of the appropriate size, composition, and type for the press from said carriers into said shuttle cars, means responsive to the presence of a pair of tire carcasses in said pair of shuttle cars for moving said pair of shuttle cars with said pair of tire carcasses deposited therein to telescope said carcasses onto said pair of chucks, means for expanding said pair of chucks to engage said carcasses, means for retracting said pair of shuttle cars, means for rotating said pair of chucks downwardly into alignment with said diaphragms, and means for contracting said pair of chucks to deposit said carcasses onto said diaphragms.

9. Apparatus for automatically loading tire carcasses into a series of molding and vulcanizing presses, each press having at least one mold cavity with a flexible and expansible diaphragm in each mold cavity, comprising a conveyor disposed for movement parallel to and in front of the series of presses, said conveyor having a plurality of carriers for supporting carcasses with their axes in a horizontal position at right angles to the front of the presses, a shuttle car for each mold cavity reciprocal at right angles to the conveyor between a position beneath the conveyor and a position adjacent the mold cavity, an expandable chuck for each mold cavity pivotally mounted over the diaphragm of the mold cavity and adapted to be rotated downwardly from a horizontal position in alignment with the shuttle car to a vertical position in alignment with the diaphragm, means responsive to a shuttle car being both empty and in a position beneath the conveyor for depositing a tire carcass from a carrier into said shuttle car, means responsive to the presence of a tire carcass in said shuttle car for moving said shuttle car with a deposited tire carcass to telescope said carcass onto said chuck, means responsive to said movement of said shuttle car for expanding said chuck to engage said carcass, means responsive to the expansion of said chuck for retracting said shuttle car, means for rotating said chuck downwardly into alignment with said diaphragm, and means for contracting said chuck to deposit said carcass onto said diaphragm.

10. Apparatus for automatically loading tire carcasses into a series of molding and vulcanizing presses, each press having at least one mold cavity with a flexible and expansible diaphragm in each mold cavity, comprising a conveyor disposed for movement parallel to and in front of the series of presses, said conveyor having a plurality of carriers for supporting carcasses with their axes in a horizontal position at right angles to the front of the presses, a shuttle car for each mold cavity reciprocal at right angles to the conveyor between a position beneath the conveyor and a position adjacent the mold cavity, tripping means mounted above the conveyor and above each shuttle car, an expandable chuck for each mold cavity pivotally mounted over the diaphragm of the mold cavity and adapted to be rotated downwardly from a horizontal position in alignment with the shuttle car to a vertical position in alignment with the diaphragm, means responsive to a shuttle car being both empty and in a position beneath the conveyor for lowering the tripping means above said shuttle car to open a carrier and deposit a tire carcass into said shuttle car, means responsive to the presence of a tire carcass in said shuttle car for moving said shuttle car with a deposited tire carcass to a position adjacent the mold cavity to telescope said carcass onto said chuck, means responsive to said movement of said shuttle car for expanding said chuck to engage said carcass, means responsive to the expansion of said chuck for retracting said shuttle car, means responsive to the opening of the press and the ejection of the cured tire for rotating said chuck downwardly into alignment with said diaphragm, means responsive to the downward rotation of said chuck for contracting said chuck to deposit said carcass by gravity onto said diaphragm, and means responsive to the contraction of the chuck for rotating said chuck upwardly into alignment with the retracted shuttle car.

11. Apparatus for automatically loading tire carcasses into a series of molding and vulcanizing presses, each press having a pair of mold cavities with a flexible and expansible diaphragm in each mold cavity, comprising a conveyor disposed for movement parallel to and in front of the series of presses, said conveyor having a plurality of carriers for supporting carcasses with their axes in a horizontal position at right angles to the front of the presses, a pair of shuttle cars for each press reciprocal at right angles to the conveyor between a position beneath the conveyor and a position adjacent the press, a pair of expandable chucks for each press pivotally mounted over said diaphragms and adapted to be rotated downwardly from a horizontal position in alignment with said pair of shuttle cars to a vertical position in alignment with said diaphragms, means responsive to a pair of shuttle cars being in a position beneath the conveyor and by at least one of said pair of shuttle cars being empty for depositing tire carcasses from said carriers into said shuttle cars, means responsive to the presence of a pair of tire carcasses in said pair of shuttle cars for moving said pair of shuttle cars with said pair of tire carcasses deposited therein to telescope said carcasses onto said pair of chucks, means responsive to said movement of said pair of shuttle cars for expanding said pair of chucks to engage said carcasses, means responsive to the expansion of said pair of chucks for retracting said pair of shuttle cars, means for rotating said chucks downwardly into alignment with said diaphragms, and means for contracting said chucks to deposit said carcasses onto said diaphragms.

12. Apparatus for automatically loading tire carcasses into a series of molding and vulcanizing presses adapted to produce tires of different size, composition and type, each press having a pair of mold cavities with a flexible and expansible diaphragm in each mold cavity, comprising a conveyor disposed for movement parallel to and in front of the series of presses, said conveyor having a plurality of carriers for supporting carcasses with their axes in a horizontal position at right angles to the front of the presses, each carrier having means to designate the specific size, composition and type of the tire carcass contained therein, a pair of shuttle cars for each press reciprocal at right angles to the conveyor between a position beneath the conveyor and a position adjacent the press, a pair of expandable chucks for each press pivotally mounted over said diaphragms and adapted to be rotated downwardly from a horizontal position in alignment with said pair of shuttle cars to a vertical position in alignment with said diaphragms, means responsive to a pair of shuttle cars being in a position beneath the conveyor, by at least one of said pair of shuttle cars being empty and by the designating means of an approaching carrier for selectively depositing tire carcasses of the appropriate size, composition, and type for the press from said carriers into said shuttle cars, means responsive to the presence of a pair of tire carcasses in said pair of shuttle cars for moving said pair of shuttle cars with said pair of tire carcasses deposited therein to telescope said carcasses onto said pair of chucks, means responsive to said movement of said pair of shuttle cars for expanding said pair of chucks to engage said carcasses, means responsive to the expansion of said pair of chucks for retracting said pair of shuttle cars, means for rotating said pair of chucks downwardly into alignment with said diaphragms, and means for contracting said pair of chucks to deposit said carcasses onto said diaphragms.

13. Apparatus for automatically loading tire carcasses into a series of molding and vulcanizing presses adapted to produce tires of different size, composition and type, each press having a pair of mold cavities with a flexible and expansible diaphragm in each mold cavity, comprising a conveyor disposed for movement parallel to and in front of the series of presses, said conveyor having a plurality of carriers for supporting carcasses with their axes in a horizontal position at right angles to the front of the presses, each carrier having means to designate the specific size, composition and type of the tire carcass loaded therein, a pair of shuttle cars for each press reciprocal at right angles to the conveyor between a position beneath the conveyor and a position adjacent the press, tripping means mounted above the conveyor and above each shuttle car, a pair of expandable chucks for each press pivotally mounted over said diaphragms and adapted to be rotated downwardly from a horizontal position in alignment with said pair of shuttle cars to a vertical position in alignment with said diaphragms, means responsive to a pair of shuttle cars being beneath the conveyor, by at least one of said pair of shuttle cars being empty, and by the designating means of an approaching carrier for selectively lowering said tripping means to open a carrier and deposit a tire carcass of the appropriate size, composition and type for the press into said shuttle car, means responsive to the lowering of the tripping means for retracting said tripping means, means responsive to the presence of a pair of tire carcasses in said pair of shuttle cars for moving said pair of shuttle cars with said pair of tire carcasses deposited therein to telescope said carcasses onto said pair of chucks, means responsive to said movement of said pair of shuttle cars for expanding said pair of chucks to engage said carcasses, means responsive to the expansion of said pair of chucks for retracting said pair of shuttle cars, means responsive to the opening of the press and the ejection of a pair of cured tires for rotating said pair of chucks downwardly into alignment with said diaphragms, means responsive to the downward rotation of said pair of chucks for contracting said pair of chucks to deposit said carcasses onto said diaphragms, and means responsive to the contraction of said chucks for rotating said pair of chucks upwardly into alignment with the retracted pair of shuttle cars.

References Cited in the file of this patent

UNITED STATES PATENTS

| | | |
|---|---|---|
| 1,082,557 | Rudolphi | Dec. 30, 1913 |
| 1,132,713 | Francisco | Mar. 23, 1915 |
| 1,643,202 | Denmire | Sept. 20, 1927 |
| 1,731,095 | Draeger | Oct. 8, 1929 |
| 1,868,562 | Chubb et al. | July 26, 1932 |
| 1,956,398 | Nullmeyer | Apr. 24, 1934 |
| 2,092,539 | Talbot | Sept. 7, 1937 |
| 2,113,712 | Robinson | Apr. 12, 1938 |
| 2,525,351 | Hennings | Oct. 10, 1950 |
| 2,841,301 | Sherriff | July 1, 1958 |
| 2,927,343 | Soderquist | Mar. 8, 1960 |

FOREIGN PATENTS

| | | |
|---|---|---|
| S34312xI/81e | Germany | Jan. 12, 1956 |

UNITED STATES PATENT OFFICE
CERTIFICATE OF CORRECTION

Patent No. 3,053,400 September 11, 1962

Edward B. Erickson et al.

It is hereby certified that error appears in the above numbered patent requiring correction and that the said Letters Patent should read as corrected below.

Column 6, line 5, for "carried" read -- carrier --; line 49, for the claim reference numeral "18" read -- 3 --; line 50, for "conected" read -- connected --; line 69, for "conveyors" read -- conveyor --.

Signed and sealed this 22nd day of January 1963.

(SEAL)
Attest:

ERNEST W. SWIDER
Attesting Officer

DAVID L. LADD
Commissioner of Patents